Patented July 28, 1936

2,048,885

UNITED STATES PATENT OFFICE 2,048,885

NICOTINIUM SALTS AND PROCESS FOR THEIR PRODUCTION

Stephen Hellicar Oakeshott, Didsbury, Manchester, England, assignor to Imperial Chemical Industries Limited, a corporation of Great Britain No Drawing. Application April 12, 1933, Serial No. 665,834. In Great Britain April 18, 1932

18 Claims. (Cl. 260—25)

The present invention relates to the production of substances valuable as insecticides.

According to the invention we cause nicotine, or the oily bases from tobacco or salts of these to interact with an inorganic ester of a long-chain-alkyl radical, to give a quaternary ammonium salt or a mixture containing quaternary ammonium salts.

Nicotine itself, as is well known, is a ditertiary base, capable of combining with, e. g. methyl iodide to give two isomeric quaternary salts. The aim of the present invention is to produce compounds in which are combined the valuable insecticidal properties of nicotine and the soap-like properties of compounds containing a long-chain-alkyl radical and a salt-forming group. Accordingly the invention is not limited to the production of any particular isomeride but contemplates the production of any derivative of nicotine to be obtained by the interaction as described. It contemplates also the production of toxic substances of improved lipoid solubility.

The term inorganic ester of a long chain alkyl radical is intended to denote inorganic esters for example the halides, i. e. chlorides, bromides, and iodides of alkyl radicals of six carbon atoms or more. When a salt of the base is employed, and the resulting product hydrolyzed, the quaternary ammonium salt which is formed is in some or all cases not identical but isomeric with that given by the base itself.

By a further feature of the invention insecticidal compositions comprise quaternary ammonium salts of the kind described, suitable dry or wet diluents, such as talc, keiselguhr, water, and if desired other ingredients, such as nicotine itself, solutions of nicotine in oils, tars and petroleum oils, especially such as themselves have insecticidal value, and the insecticidal compositions may accordingly be in the form of dry powders, aqueous solutions, emulsions, etc.

The invention is illustrated by the following examples in which the parts are by weight.

Example 1

16.5 parts of dry 95% commercial nicotine are heated to 120–125° C. with 33 parts of octadecyl bromide for 1 hour. A dark red viscid liquid is obtained which sets to a sticky mass on cooling. This substance is soluble in cold water up to about 3%. This aqueous solution possesses soap like properties and is a valuable insecticide.

Example 2

12.2 parts of nicotine hydrobromide and 12.8 parts of dodecyl bromide are heated together with stirring to a temperature of 165–170° C. for five hours. The dark red product is completely soluble in water and the ionizable bromine as found by potentiometric titration is 29.7% (dodecyl nicotinium bromide hydrobromide required 32%). This product (20 parts) is heated with 5.25 parts of potassium carbonate in methyl alcoholic solution for 2 hours after which the solution is evaporated to dryness and then extracted with dry benzene. The material obtained by evaporating the benzene solution to dryness is a dark red gummy mass containing 16.6% Br. It is readily soluble in water giving solutions of high surface activity.

Example 3

39.7 parts of nicotine hydrochloride and 51.4 parts of dodecyl bromide are heated together at 165–170° C. with stirring for 5 hours. The resulting dark red product is similar in properties to that obtained in Example 2. The ionizable halide on estimation is Br=17.4% and Cl=7.8% (dodecyl nicotinium bromide hydrochloride required Br=17.5% and Cl=7.8%). The product (85 parts) is heated with 13 parts potassium carbonate in aqueous methyl alcoholic solution for 2 hours and the product first evaporated to dryness and then extracted with dry benzene. The material obtained by evaporating the benzene solution is a dark red gummy mass containing 16.5% Br, 0.9% Cl. It dissolves readily in water giving solutions with high surface activity.

Example 4

24.3 parts of dry 95% commercial nicotine and 77.1 parts of dodecyl bromide are heated together at 165–170° C. for two hours with stirring. The reaction product is then completely soluble in water without turbidity to the extent of over 30%. The ionizable bromine content is 22.74%. Didodecyl nicotinium dibromide requires 23.64%.

As many apparently widely different embodiments of this invention may be made without departing from the spirit and scope thereof, it is to be understood that I do not limit myself to the foregoing examples except as indicated in the following claims:

I claim:

1. Process for the production of substances having insecticidal properties which comprises reacting at superatmospheric temperatures nicotine with an aliphatic halide of about 12 to about 18 carbon atoms.

2. Process for the production of substances having insecticidal properties which comprises reacting at superatmospheric temperatures a nicotine hydrohalide with dodecyl bromide, followed by partial hydrolysis of the resulting quaternary ammonium salt.

3. Process for the production of substances having insecticidal properties which comprises reacting at superatmospheric temperatures nicotine with dodecyl bromide.

4. Process for the production of substances having insecticidal properties which comprises reacting at superatmospheric temperatures a nicotine hydrohalide with dodecyl bromide.

5. Process for the production of substances having insecticidal properties which comprises reacting at superatmospheric temperatures a member of the group consisting of nicotine and its hydrohalides with an aliphatic halide of about 12 to about 18 carbon atoms.

6. Process for the production of substances having insecticidal properties which comprises reacting at superatmospheric temperatures a member of the group consisting of nicotine and its hydrohalides with a dodecyl halide.

7. Process for the production of substances having insecticidal properties which comprises reacting at superatmospheric temperatures a nicotine hydrohalide with a dodecyl halide.

8. A nicotinium sale in which at least one nitrogen of the nicotine nucleus has attached thereto a halogen atom and an aliphatic radical of about 12 to about 18 carbon atoms.

9. A nicotinium salt in which at least one nitrogen of the nicotine nucleus has attached thereto a bromine atom and a dodecyl radical.

10. The product obtainable by reacting a nicotine hydrohalide with an aliphatic halide of about 12 to about 18 carbon atoms, followed by partial hydrolysis of the resulting quaternary ammonium salt.

11. Dodecyl nicotinium bromide.

12. A nicotinium salt in which each nitrogen of the nicotine nucleus has attached thereto a halogen atom and an aliphatic radical of about 12 to about 18 carbon atoms.

13. Didodecyl nicotinium dibromide.

14. A nicotinium salt in which at least one nitrogen of the nicotine nucleus has attached thereto a bromine atom and an octadecyl radical.

15. Octadecyl nicotinium bromide.

16. Process for the production of substances having insecticidal properties which comprises reacting at superatmospheric temperatures a nicotine hydrohalide with an aliphatic halide of about 12 to about 18 carbon atoms.

17. Process for the production of substances having insecticidal properties which comprises reacting at superatmospheric temperatures a nicotine hydrohalide with an aliphatic halide of about 12 to about 18 carbon atoms, followed by partial hydrolysis of the resulting quaternary ammonium salt.

18. Process for the production of substances having insecticidal properties which comprises reacting at superatmospheric temperatures nicotine with octadecyl bromide.

STEPHEN HELLICAR OAKESHOTT.